(12) United States Patent  
Sako

(10) Patent No.: US 6,336,579 B1  
(45) Date of Patent: Jan. 8, 2002

(54) HELMET STORAGE AREA FOR MOTORCYCLES

(75) Inventor: Hiroyuki Sako, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/536,981

(22) Filed: Mar. 29, 2000

(30) Foreign Application Priority Data

Mar. 30, 1999 (JP) ............................................ 11-087540

(51) Int. Cl.⁷ ................................................ B62J 11/00
(52) U.S. Cl. ........................ 224/413; 224/429; 224/433; 180/219
(58) Field of Search ................................ 224/413, 429, 224/433; 180/219

(56) References Cited

U.S. PATENT DOCUMENTS

| 4,697,664 A | * | 10/1987 | Kohyama | 180/226 |
| 4,726,439 A | * | 2/1988 | Iwao et al. | 180/219 |
| 4,915,188 A | * | 4/1990 | Ota et al. | 180/219 |
| 4,964,483 A | * | 10/1990 | Yokoyama et al. | 180/219 |
| 5,433,286 A | * | 7/1995 | Kumamaru et al. | 180/219 |
| 6,073,719 A | * | 6/2000 | Ohmika et al. | 180/219 |

FOREIGN PATENT DOCUMENTS

JP       A325089       1/1991

* cited by examiner

Primary Examiner—Stephen K. Cronin  
(74) Attorney, Agent, or Firm—Birch, Stewart, Kolasch & Birch, LLP

(57) ABSTRACT

A motorcycle having a storage box disposed below a rear seat. The storage box has a front storage area defined in a front portion thereof for storing a helmet in a vertically oriented attitude and a rear storage area defined in a rear portion thereof for storing another helmet in a laterally tilted attitude obliquely rearwardly from the first helmet.

15 Claims, 5 Drawing Sheets

HELMET STORAGE AREA FOR MOTORCYCLES

BACKGROUND OF THE INVENTION

1. Field of the Invention

The present invention relates to helmet storage devices, in particular, a helmet storage device on a motorcycle, which is a storage box for storing two helmets.

2. Background Art

Heretofore, there is known a motorcycle/motorbike having a helmet storage box underneath a passenger seat (see Japanese Patent Laid-open No. Hei3-25089).

A motorcycle for carrying two persons should have a storage box for storing two helmets. The storage box may be either:

1) a structure capable of storing two helmets longitudinally in tandem; or
2) a structure capable of storing two helmets laterally in parallel.

With the structure 1), the storage box is longitudinally long, and as a result, a seat for covering an upper region of the storage box is also longitudinally long. The longitudinally long seat is reduced in mechanical strength and operability. Moreover, because two helmets need to be stored in the limited longitudinal space, the storage box must be constructed bulkily, and the seat is necessarily higher than desired. With the structure 2), the storage box is overly bulky in the lateral direction of the motorcycle. However, because the storage box must comply with the lateral width of the motorcycle, the inlet/outlet opening thereof is narrowed, making it difficult to store and remove helmets from the interior of the storage box. In addition, the storage box is caused to be high for the same reasons as those of the structure 1).

SUMMARY OF THE INVENTION

The present invention has been made in view of the above problems. It is an object of the present invention to provide a novel helmet storage device in a motorcycle, which is capable of storing two helmets, while solving the above problems.

To achieve the above object and additional objects, there is provided a vehicle storage area for helmets, comprising a storage box having a front storage area defined in a front portion thereof for storing a first helmet in a vertically oriented attitude, and a rear storage area defined in a rear portion thereof for storing a second helmet in a laterally tilted attitude obliquely rearwardly from said first helmet.

Furthermore, the present invention provides a helmet storage box attached to a vehicle having a body frame assembly constituted by a frame member having a plurality of wheels and a seat member attached thereto, and propulsion means, said helmet storage box comprising a front wall, left and right side walls attached respectively to opposite lateral sides of said front wall, a rear outwardly convex shaped wall attached continuously to said left and right side walls, a bottom wall attached continuously to edges of said front wall, said left and right side walls, and said rear wall, and a lid member integral with the seat member and defining a bottom surface thereof and pivotally coupled to the frame member, said lid member having a spherical recess extending along a portion thereof Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
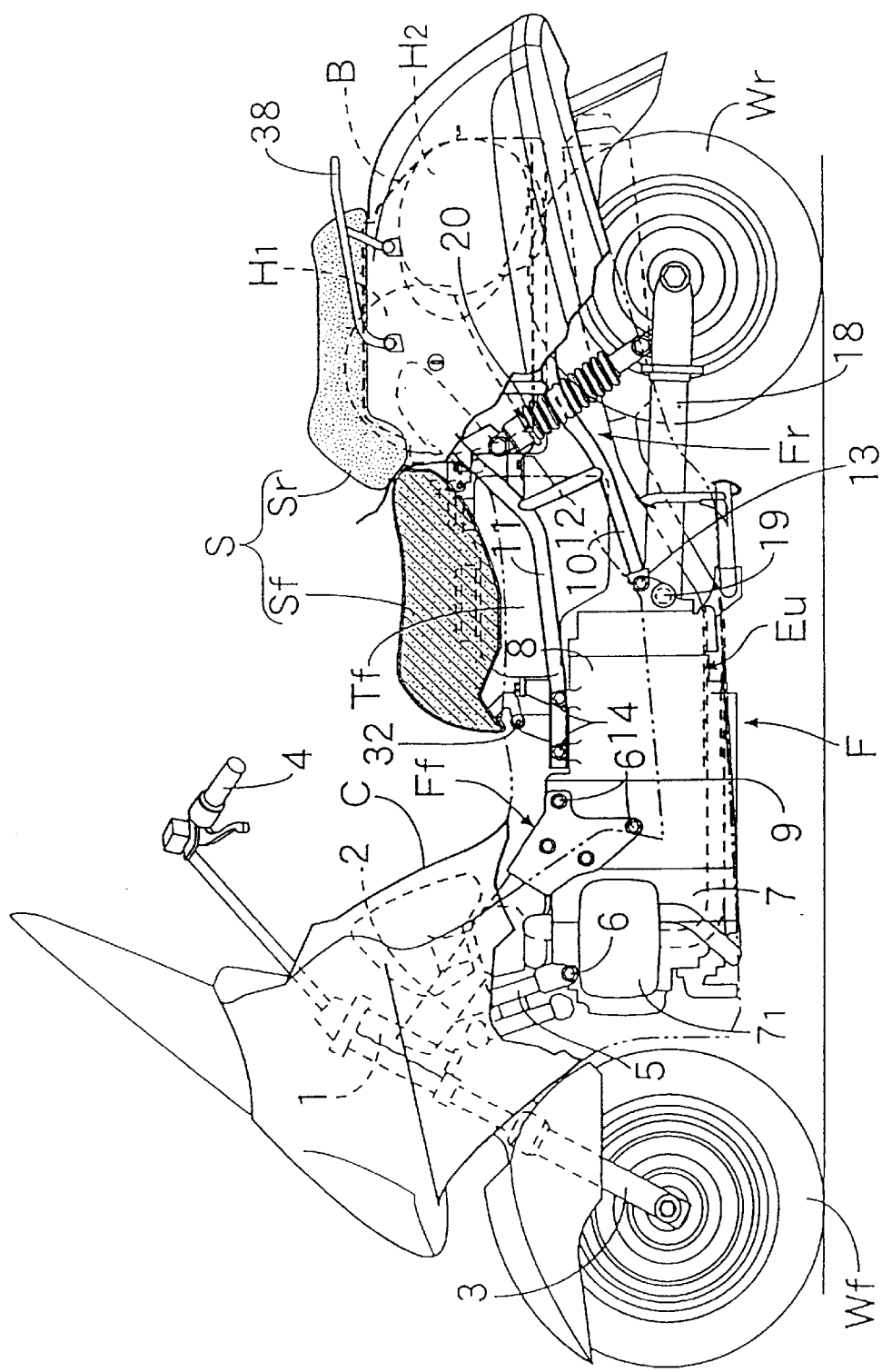
FIG. 1 is a partial cross sectional side view of a scooter-type motorcycle which has a helmet storage device according to the present invention.

The present invention will hereafter be described below with reference to an embodiment shown in the drawings. The drawings refer to a Motor-scooter vehicle, however the use of such a vehicle is for illustrative purposes only, and should not be construed as limiting the present invention. The present invention may be employed on various vehicle types.

An embodiment in which the present invention is applied to a scooter-type motorcycle will be described below with reference to FIGS. 1 through 5.

The terms "upper" and "lower", "left" and "right", and "front" and "rear" will be used herein with respect to the direction of travel of the motorcycle.

Figure 2:
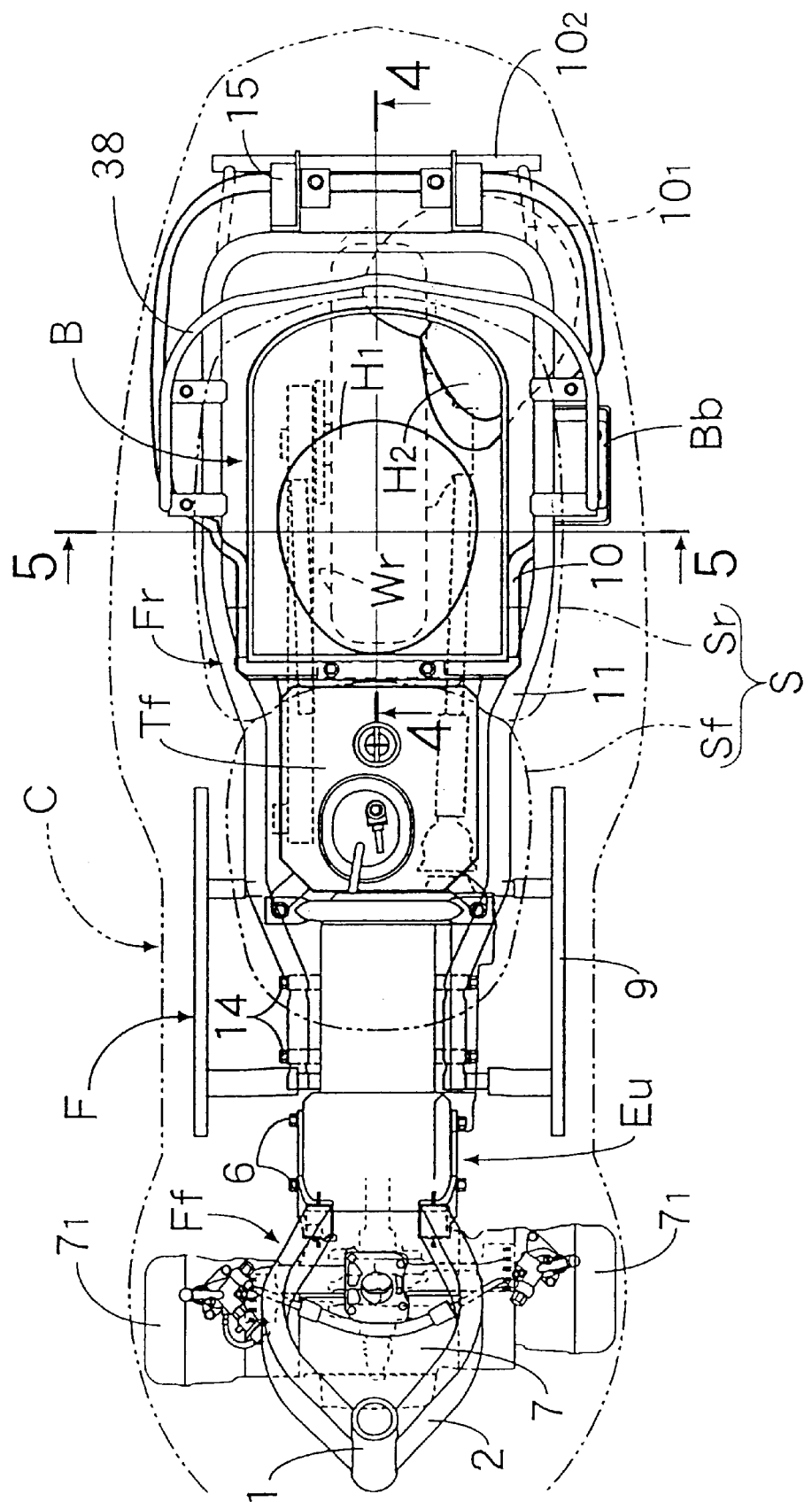
FIG. 2 is a plan view of the motorcycle with the helmet storage device, with a motorcycle body cover and a seat being omitted from illustration.

Referring to FIGS. 1 and 2, a body frame assembly F is illustrated which serves as the framework of a motorcycle. The body frame assembly F includes a front frame Ff, an engine unit Eu for propelling the motorcycle, and a rear frame Fr which are integrally joined together. The front frame Ff has a head pipe 1 and a bifurcated main pipe 2 extending integrally therefrom in rearward and downward directions. The main pipe 2 comprises a pipe of rectangular cross section. On the head pipe 1, there is steerably supported a front fork 3 with a front wheel Wf mounted on a lower end thereof by a shaft. A steering handle 4 is fixed to the upper end of the front fork 3. The engine unit Eu has an upper portion fixed to the lower end of the main pipe 1 and the lower end of a support frame 5 which extends downwardly from the main pipe 1, by a plurality of connecting bolts 6. The engine unit Eu has a front portion suspended from the front frame Ff The engine unit Eu has a horizontally opposed engine 7 in its front portion. The engine 7 has a pair of cylinders $7_1$ extending substantially horizontally in left and right outward directions, and a crankshaft extending longitudinally. The engine unit Eu also has a transmission case 8 in its rear portion that is suspended from the rear frame Fr.

The rear frame Fr is in the form of an upwardly and downwardly open frame having a rear pipe 10, a seat rail 11 disposed above the rear pipe 10, and a plurality of joint pipes 12 integrally interconnecting the rear pipe 10 and the seat rail 11. A storage box B for storing two helmets $H_1$, $H_2$, described hereinafter, is disposed in the rear frame Fr. The rear pipe 10 has a front end integrally coupled to a rear end of the engine unit Eu, i.e., opposite ends of a rear end of the transmission case 8, by joint bolts 13, and extends upwardly in the rearward direction. Left and right side pipes $10_1$ are removably coupled to the rear end of the rear pipe 10. The left and right side pipes $10_1$ have rear ends connected to each other by an end pipe $10_2$.

Figure 3:
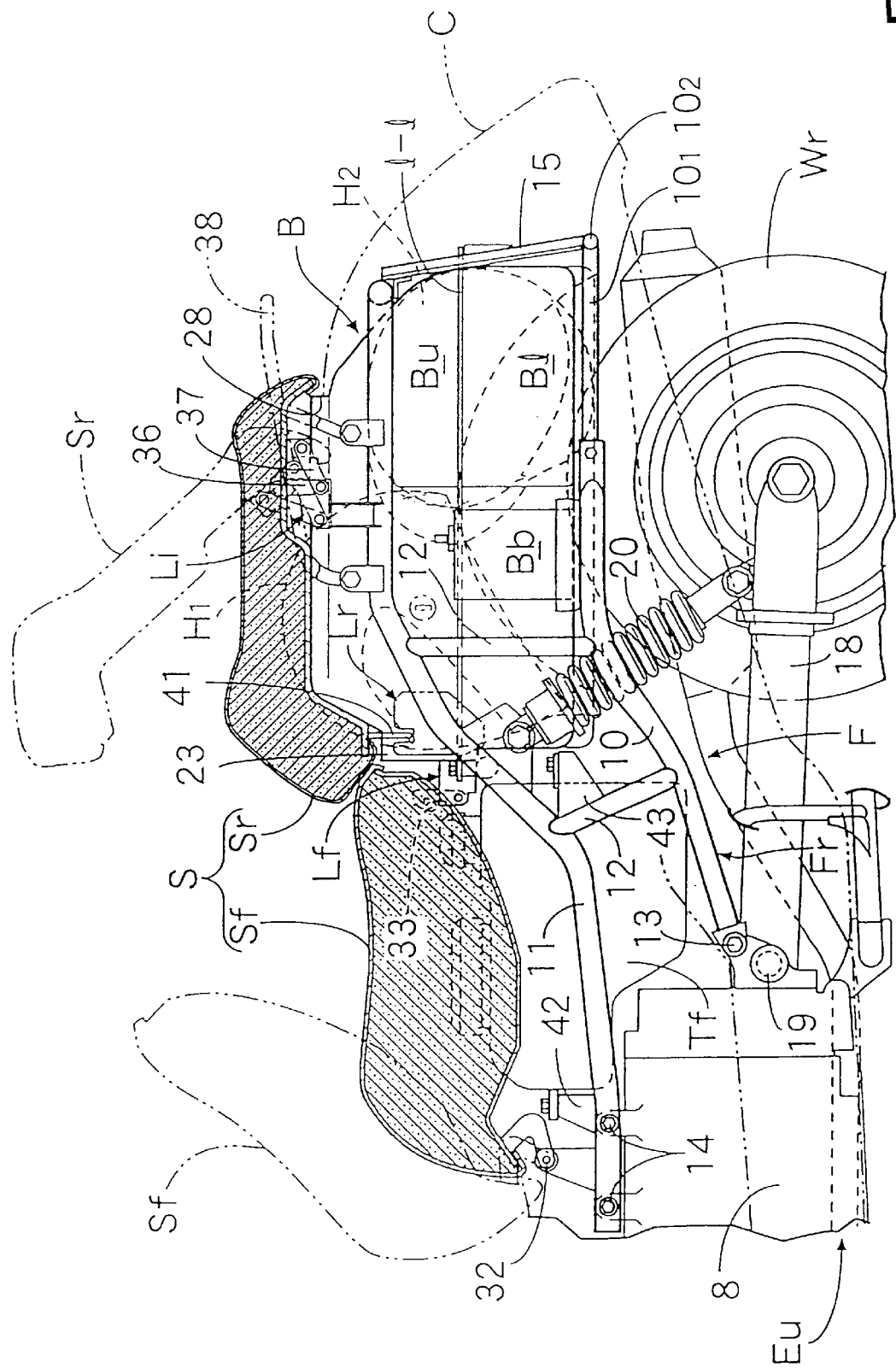
FIG. 3 is a partial cross sectional enlarged side view of a rear portion of the motorcycle with the helmet storage device of the present invention.

As illustrated in FIGS. 2 and 3, the seat rail 11 extends rearwardly above the rear pipe 10 substantially parallel thereto, and has a U-shape with a closed rear end, as viewed in plan. The seat rail 11 has front left and right ends integrally coupled to left and right upper surfaces of the engine unit Eu by joint bolts 14. The rear pipe 10 and the seat rail 11 are integrally joined to each other by the plurality of joint pipes 12. Two brackets 15 that are laterally spaced from each other are erected integrally from the end pipe $10_2$. The brackets 15 have upper ends removably connected to the rear end of the seat rail 11. The left and right side pipes $10_1$, the end pipe $10_2$, and the brackets 15 are integral with each other, and removably attached to the rear ends of the rear pipe 10 and the seat rail 11, for allowing a storage box B, descried hereinafter, to be mounted easily within the rear frame Fr.

As illustrated in FIG. 1, most of the body frame assembly F configured with the front frame Fr, the engine unit Eu, and the rear frame Fr is covered with a body cover C.

As illustrated in FIGS. 1 through 3, a swing arm 18 is vertically swingably supported on a lower portion of the rear end of the engine unit Eu by a pivot shaft 19. A rear wheel Wr is rotatably mounted on the rear end of the swing arm 18 by a shaft. A rear damper 20 is connected between the swing arm 18 and the rear frame Fr. The swing arm 18 houses a known power transmitting mechanism (not shown) for transmitting the power of the engine unit Eu to the rear wheel Wr. A foot rest frame 9 projecting laterally is fixed to a lower portion of the engine unit Eu.

The rear frame Fr has an open space defined upwardly and downwardly therein above the rear wheel Wr. The space accommodates therein the storage box B according to the embodiment.

Structural details of the storage box B will be now be described below with reference to FIGS. 1 through 3 and in addition to FIGS. 4 and 5. The storage box B is constructed of metal plates or synthetic resin plates, and has an upwardly open lower box B1 and an upwardly and downwardly open upper box Bu which is integrally coupled to the upper edge of the opening of the lower box B1. The lower box B1 has a joint flange projecting outwardly from the upper edge of the opening thereof, and the upper box Bu has a joint flange projecting outwardly from the lower edge of the opening thereof These joint flanges are integrally joined to each other along a joint line 1—1, which extends substantially horizontally in the longitudinal direction, as shown in FIG. 3. The storage box B is removably fixed to the rear frame Fr by a plurality of joint bolts 22.

The storage box B is accommodated in the rear frame Fr, and a longitudinal length which is large enough to accommodate the two helmets $H_1$, $H_2$ in longitudinally overlapping relation at longitudinally spaced positions, and a transverse width which is smaller than the width of the motorcycle. The storage box B has a box shape with its transverse width greater in a rear portion thereof than in a front portion thereof, and has a flat front wall 23, left and right side walls 24, 25 extending rearwardly substantially at a right angle from the respective left and right edges of the front wall 23, a rear wall 26 joined smoothly continuously to the rear edges of the left and right side walls 24, 25, and shaped as a rearwardly convex dome, and a bottom wall 27 closing a lower opening surrounded by the front wall 23, the left and right side walls 24, 25, and the rear wall 26.

The storage box B has an inlet/outlet opening defined in its upper region. The storage box B has a front storage area Af defined in a front portion thereof for storing the front helmet $H_1$ in a vertically erected attitude and a rear storage area Ar defined in a rear portion thereof for storing the rear helmet $H_2$ in a laterally tilted attitude obliquely rearwardly from the helmet $H_1$, the front and rear storage area Af and Ar being formed continuously. The transverse width of the rear storage area Ar is greater than the transverse width of the front storage area Af As clearly illustrated in FIGS. 4 and 5, a tire house 30 which is faced with an upper surface of the rear wheel Wr is formed on the bottom wall 27 of the storage box B astride of the front and rear storage areas Af, Ar. The tire house 30 is shaped as an arch in a laterally central portion of the bottom wall 27 and extends substantially the full longitudinal length of the bottom wall 27 toward the storage box B. The tire house 30 allows an arched central bottom wall 27c, extending as a recess into the laterally central portion of the storage box B and left and right bottom walls 27l, 27r positioned laterally of the arched central bottom wall 27c and deeper than the arched central bottom wall 27c, to be formed in the storage box B. The outwardly convex dome of the rear wall 26 is shaped substantially complementarily to the upper surface of the rear helmet $H_2$, and fits over the upper surface of the rear helmet $H_2$ stored in the rear portion of the storage box B for thereby stably supporting the rear helmet $H_2$.

The inlet/outlet opening 28 defined in the upper region of the storage box B has an area smaller than the transverse cross sectional area of a central portion thereof The front helmet, i.e., a full-face-type helmet $H_1$, or the like, is placed from the inlet/outlet opening 28 into the front storage area Af of the storage box B and stored therein in a vertically erected attitude. The helmet $H_1$ has its lower opening edge seated along the arched central bottom wall 27c of the bottom wall 27 without any clearance therebetween. The rear helmet, i.e., the jet-type helmet $H_2$, or the like, is stored in the rear storage area Ar of the storage box B in a laterally or transversely tilted attitude obliquely rearwardly from the front helmet $H_i$. The rear helmet $H_2$ has a lower portion falling in the deeper left storage region, with the arched central bottom wall 27c being partly positioned in the opening of the rear helmet $H_2$, for thereby reducing the height of the rear helmet $H_2$ thus stored.

Figure 4:
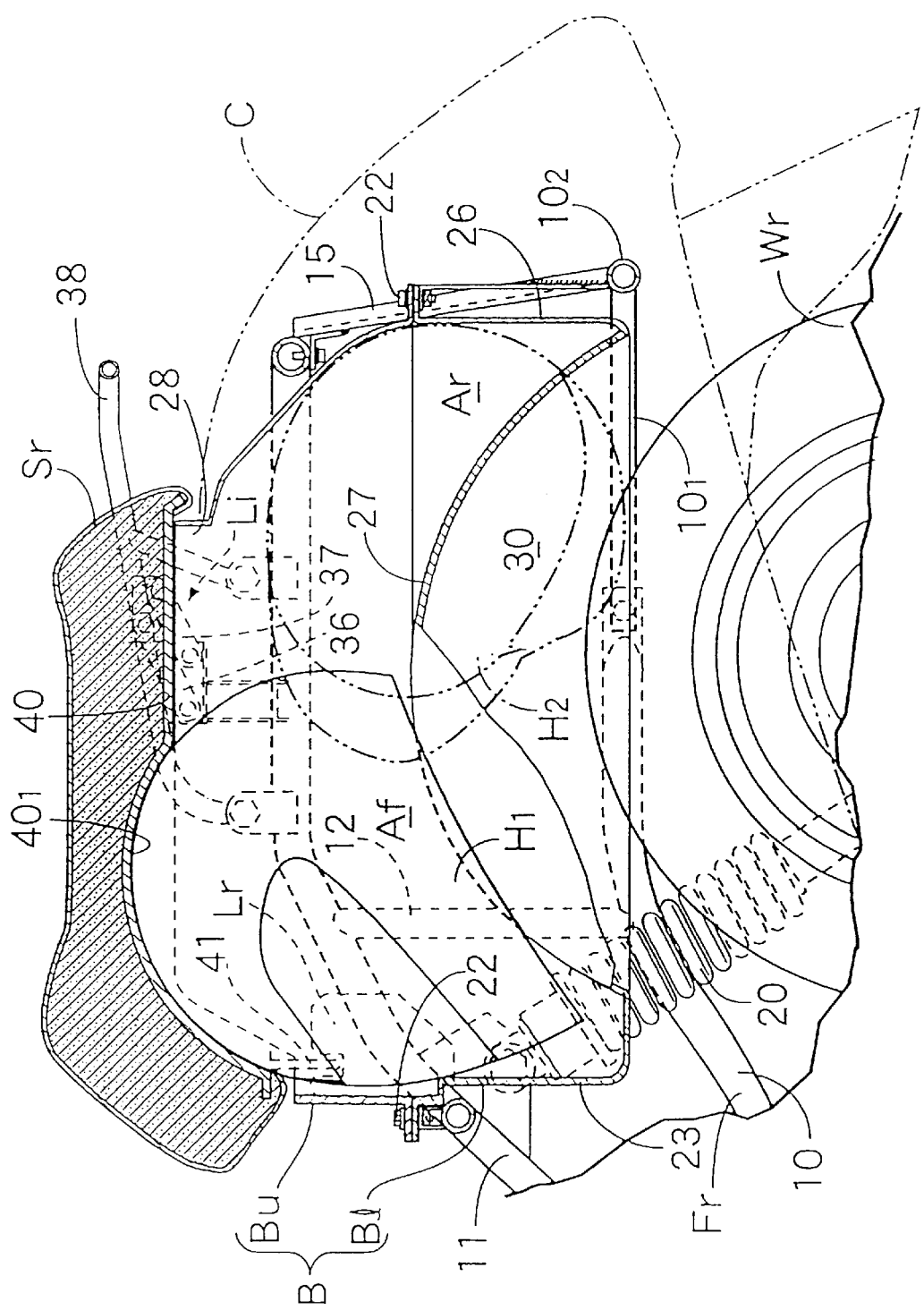
FIG. 4 is a cross sectional view taken along line 4—4 of FIG. 2.
Figure 5:
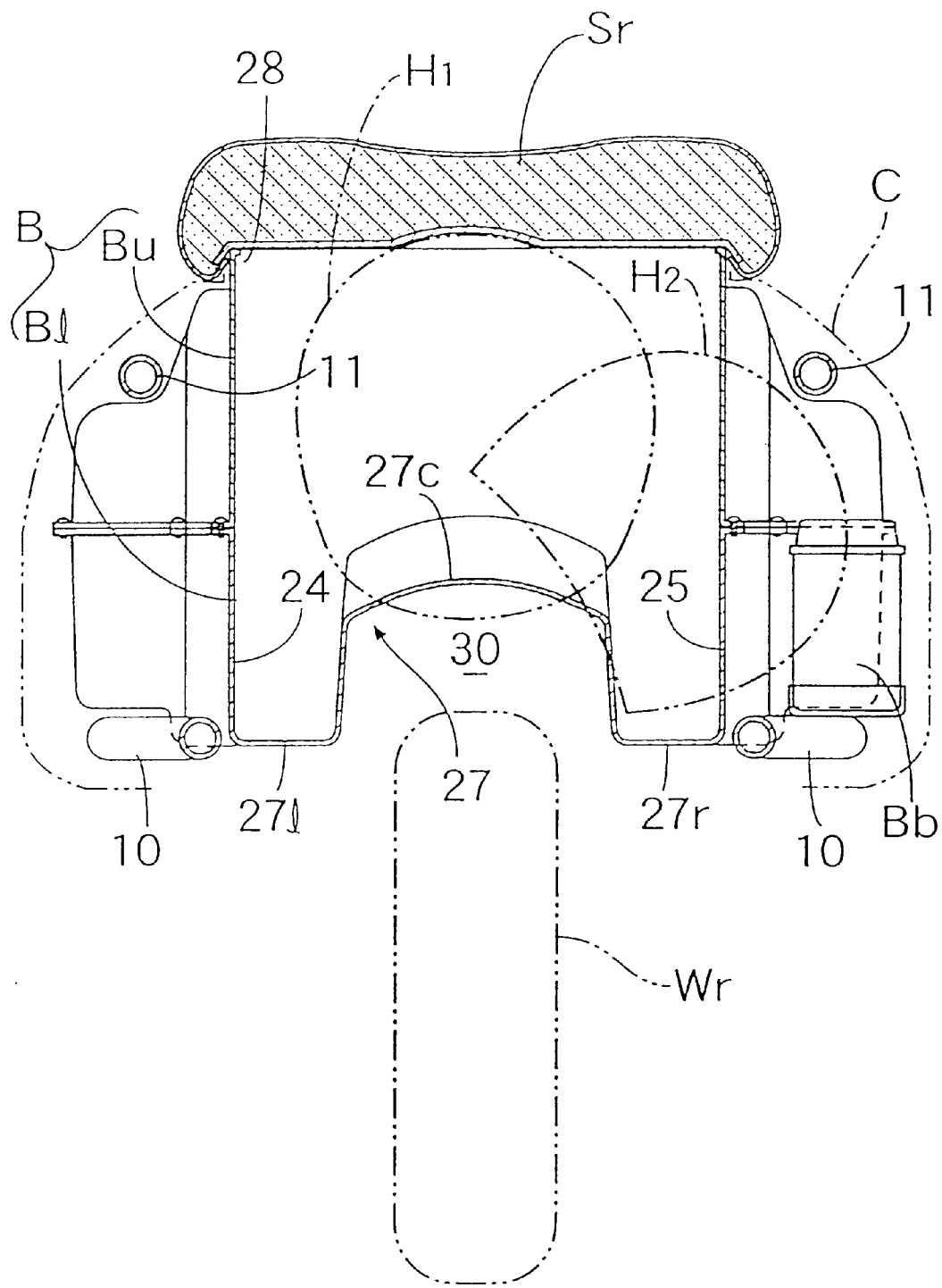
FIG. 5 is a cross sectional view taken along line 5—5 of FIG. 2.

As shown in FIG. 4, with two helmets $H_1$, $H_2$ stored in the storage box B, the helmets $H_1$, $H_2$ overlap each other in the longitudinal direction, so that the longitudinal length of the stored helmets $H_1$, $H_2$ can be reduced.

A seat S for persons to be seated thereon is openably and closably mounted on the seat rail 11 of the rear frame Fr. The seat S comprises a front seat Sf for a driver to be seated thereon and a rear seat Sr for a passenger to be seated thereon, which are divided from each other in the longitudinal direction. However, the seat S may be integrally contiguous if so desired.

The front and rear seats Sf, Sr are arranged longitudinally in tandem along the longitudinal axis of the body frame F. The front seat Sf is positioned immediately in front of the storage box B, and the rear seat Sr is positioned immediately above the storage box B. When the rear seat Sr is closed or pushed down, it closes the inlet/outlet opening 28.

The front seat Sf has a front lower end coupled to the seat rail 11 by a hinge pin 32, and hence can be opened and closed rearwardly about the hinge pin 32. The front seat Sf supports a lock member 33 on its rear lower end for disengageable locking engagement with a front lock device Lf with a key cylinder on the seat rail 11. When the front seat Sf is pushed down, the lock member 33 automatically engages the front lock device Lf. The rear seat Sr has a rear lower end coupled to the seat rail 11 by a link mechanism Li. The link mechanism Li comprises a first link 36 and a second link 37 disposed rearwardly of the first link 36 and slightly shorter than the first link 36. The first and second links 36, 37 are substantially parallel to each other, and have lower ends connected to the seat rail 11 by pins and upper ends connected to the rear lower end of the rear seat Sr by pins. The rear seat Sr can be opened and closed forwardly by means of the link mechanism Li. When the rear seat Sr is opened, it moves slightly forwardly as indicated by the two-dot-and-dash lines in FIG. 3, so that the rear seat Sr can be opened out of interference with a grip 38 mounted on the seat seal 11.

As illustrated in FIG. 3, the front wall 23 of the storage box B has an upper edge extending to a position near the rear end of the front seat Sf, and the rear seat Sr which closes the inlet/outlet opening 28 of the storage box B has a front edge positioned in superposed relation to the rear edge of the front seat Sf The rear seat Sr can be opened and closed, while the front seat Sf remains in the closed state, for placing the helmets $H_1$, $H_2$ or other articles into and out of the storage box B.

As illustrated in FIG. 4, the rear seat Sr has a bottom plate 40 having a continuous spherical recess $40_1$ defined therein which extends from the front wall 23 of the storage box B to a seated position of the rear seat Sr. The spherical recess $40_1$ fits over the upper surface of the front helmet $H_1$ in the storage box B, and can hold the front helmet $H_1$ against wobbling movement when the rear seat Sr is closed.

The rear seat Sr supports a lock member 41 on its front lower end for disengageable locking engagement with a rear lock device Lr with a key cylinder on the seat rail 11. When the rear seat Sr is pushed down, the lock member 41 automatically engages the rear lock device Lr.

The front and rear lock devices Lf, Lr and the lock members 33, 41 are of the conventional nature, and will not be described in further detail.

Referring now to FIG. 3, a fuel tank Tf of synthetic resin for supplying a fuel to the engine unit Eu is disposed below the front seat Sf The fuel tank Tf has a front portion extending to a position over the transmission case 8 of the engine unit Eu and supported thereon by a bracket 42, and a rear portion supported on the rear frame Fr by a bracket 43.

A battery box Bb (see FIG. 5) housing a battery therein is supported on a left-hand side of the storage box B. The grip 38 which surrounds the rear portion of the rear seat Sr is fixed to the seat rail 11.

Operation of the embodiment will be described below.

When the rear seat Sr is opened, the two helmets $H_1$, $H_2$ are placed through the inlet/outlet opening 28 into the storage box B. Specifically, as seen in FIGS. 4 and 5, the full-face-type helmet $H_1$, or the like, is stored in a laterally central position in the front storage area Af of the storage box B in a vertically erected attitude. The helmet $H_1$ has its lower opening edge seated in fitting relation to the arched central bottom wall 27c which defines the tire house 30, and a front face held in abutment against the inner surface of the front wall 23. The other jet-type helmet $H_2$, or the like, is stored in a left-hand region of the rear storage area Ar of the storage box B in a transversely tilted attitude obliquely rearwardly from the front helmet $H_1$. The jet-type helmet $H_2$ leans against the left side wall 24, with the arched central bottom wall 27c being partly positioned in the helmet $H_2$ The helmet $H_2$ has its outer surface fitting along the inner surface of the rear wall 26. In this manner, even though the tire house 30 is formed in the storage box B, the rear helmet $H_2$ can be stored out of interference with the tire house 30.

The front and rear helmets $H_1$, $H_2$ have respective rear and front portions overlapping each other (see FIG. 3), so that the longitudinal length of the storage box B can be reduced by the overlapping length of the front and rear helmets $H_1$, $H_2$. The stored height of the rear helmet $H_2$ can be reduced because the rear helmet $H_2$ is transversely tilted obliquely rearwardly from the front helmet $H_1$.

Once the two helmets $H_1$, $H_2$ are stored in the storage box B, the rear seat Sr may be securely closed. The bottom plate 40 with the recess $40_1$ can hold the front helmet $H_1$ in position against wobbling movement.

The tire house 30 is formed on the bottom wall 27 of the storage box B and extends as a recess into the storage box B. The tire house 30 allows the storage box B to be positioned near the rear wheel Wr, so that the overall height of the storage box B from ground is reduced.

While the embodiment of the present invention has been described above, the present invention is not limited to the embodiment, and can be modified within the scope thereof For example, while the full-face-type helmet and the jet-type helmet are stored in the above embodiment, the storage box can store two helmets regardless of their types. In the embodiment, the seat comprises the front and rear seats that are longitudinally divided. However, the seat may comprise a tandem seat which is constructed of front and rear seats that are integral with each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle storage area for helmets, comprising:
   a storage box having at least left and right vertical side walls, said storage box having a front storage area defined in a front portion thereof for storing a first helmet in a vertically oriented attitude, with respect to said left and right side walls, and a rear storage area defined in a rear portion thereof for storing a second helmet in a laterally tilted attitude, with respect to said left and right side walls, and obliquely rearwardly from said first helmet.

2. A vehicle storage area for helmets, comprising:
   a storage box, said storage box is constituted by a front wall, left and right side walls attached respectively to opposite lateral sides of said front wall, a rear outwardly convex shaped wall attached continuously to said left and right side walls, and a bottom wall attached continuously to edges of said front wall, said left and right side walls, and said rear wall and said storage box having a front storage area defined in a front portion thereof for storing a first helmet in a vertically oriented attitude, with respect to said left and right side walls, and a rear storage area defined in a rear portion thereof for storing a second helmet in a laterally tilted attitude, with respect to said left and right side walls, and obliquely rearwardly from said first helmet.

3. The vehicle storage area for helmets according to claim 2, wherein said front storage area has a first transverse width less than a second transverse width of said rear storage area.

4. The vehicle storage area for helmets according to claim 2, wherein said storage box is constituted by an upwardly open lower box, and an upwardly and downwardly open upper box integrally coupled to an upper edge of an opening of the lower box.

5. The vehicle storage area for helmets according to claim 4, wherein said lower box has a joint flange projecting outwardly from the upper edge of the opening, and said upper box has another joint flange projecting outwardly from a edge of a bottom opening thereof, whereby connection of the two flanges together integrally joins said lower and upper boxes as one.

6. The vehicle helmet storage area according to claim 2, wherein said bottom wall includes an arch portion formed in a laterally central portion thereof and extends substantially a full longitudinal length of said bottom wall.

7. The vehicle helmet storage area according to claim 6, wherein lateral portions of said bottom wall, on sides of the arch portion, are deeper than the arch portion.

8. The vehicle helmet storage area according to claim 2, wherein said storage box comprises an inlet/outlet opening formed in an upper region of said storage box, said inlet/outlet opening having an area smaller than a transverse cross sectional area of an interior central portion of said storage box.

9. The vehicle helmet storage area according to claim 8, further comprising a lid member having a spherical recess extending along a portion thereof.

10. A helmet storage box attached to a vehicle having a body frame assembly constituted by a frame member having a plurality of wheels and a seat member attached thereto, and propulsion means, said helmet storage box comprising:

a front wall;

left and right side walls attached respectively to opposite lateral sides of said front wall;

a rear outwardly convex shaped wall attached continuously to said left and right side walls;

a bottom wall attached continuously to edges of said front wall, said left and right side walls, and said rear wall; and a lid member integral with the seat member and defining a bottom surface thereof and pivotally coupled to the frame member, said lid member having a spherical recess extending along a portion thereof.

11. The vehicle according to claim 10, wherein the seat member comprises a first seat and a second seat arranged longitudinally in tandem, said storage box for the helmets having an upper region covered with said second seat.

12. The vehicle according to claim 10, wherein said bottom wall has an arch portion formed in a laterally central portion thereof and extends substantially a full longitudinal length of said bottom wall, said arch portion for accommodating a portion of one the plurality of wheels.

13. The vehicle according to claim 12, wherein lateral portions of said bottom wall, on sides of the arch portion, are deeper than the arch portion.

14. The vehicle according to claim 10, wherein said lid member and said front, side, rear and bottom walls of said storage box constitute a front storage area defined in a front portion of said storage box for storing a first helmet in a vertically oriented attitude, and a rear storage area defined in a rear portion of said storage box for storing a second helmet in a laterally tilted attitude obliquely rearwardly from said first helmet.

15. The vehicle according to claim 14, wherein said first helmet is a full-face type and said second helmet is an open-face type, and during storage thereof said first and second helmets overlap each other in a longitudinal direction of said storage box.

* * * * *